United States Patent
Reiner et al.

(10) Patent No.: US 10,421,915 B2
(45) Date of Patent: Sep. 24, 2019

(54) CRUDE BIO OIL PRETREATMENT AND UPGRADING

(71) Applicant: ExxonMobil Research and Engineering Company, Annandale, NJ (US)

(72) Inventors: Virginia M. Reiner, Weehawken, NJ (US); Rustom M. Billimoria, Hellertown, PA (US); William G. Borghard, Haddon Heights, NJ (US); William E. Lewis, Baton Rouge, LA (US); John S. Buchanan, Flemington, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 124 days.

(21) Appl. No.: 15/367,355

(22) Filed: Dec. 2, 2016

(65) Prior Publication Data
US 2017/0158967 A1  Jun. 8, 2017

Related U.S. Application Data

(60) Provisional application No. 62/262,948, filed on Dec. 4, 2015.

(51) Int. Cl.
*C10G 53/02* (2006.01)
*C10G 69/06* (2006.01)
*C10G 9/00* (2006.01)
*C10B 55/00* (2006.01)
*C10B 57/04* (2006.01)

(52) U.S. Cl.
CPC .............. *C10G 9/005* (2013.01); *C10B 55/00* (2013.01); *C10B 57/04* (2013.01); *C10G 9/007* (2013.01); *C10G 53/02* (2013.01); *C10G 69/06* (2013.01); *C10G 2300/1011* (2013.01); *Y02P 20/145* (2015.11); *Y02P 30/20* (2015.11)

(58) Field of Classification Search
CPC ........ C10G 9/005; C10G 9/007; C10G 53/02; C10G 69/06; C10G 2300/1014; C10G 2300/205; C10G 2300/301; C10B 57/005
See application file for complete search history.

(56) References Cited

U.S. PATENT DOCUMENTS

| | | | |
|---|---|---|---|
| 2010/0034283 A1 | 2/2010 | Chujoh et al. | |
| 2012/0251424 A1* | 10/2012 | Havlik | C10G 3/45 423/322 |
| 2014/0148609 A1* | 5/2014 | Roussis | C10L 1/00 554/176 |

OTHER PUBLICATIONS

U. Jena et al., Effect of Operating Conditions of Thermochemical Liquefaction on Biocrude Production from Spirulina Platensis, 102 Bioresour. Technol. 6221-6229 (2011) (Year: 2011).*

* cited by examiner

*Primary Examiner* — Randy Boyer
(74) *Attorney, Agent, or Firm* — Amanda K. Norwood

(57) ABSTRACT

Systems and methods are provided for pretreatment and upgrading of crude bio oils for further processing and/or use as fuel products. Crude bio oils can be treated by one or more of flash fractionation and thermal cracking to generate fractions suitable for further processing, such as further hydroprocessing. Blending of crude bio oil fractions with mineral feeds can also be used to reduce metals contents to levels suitable for refinery processing.

13 Claims, 5 Drawing Sheets

CRUDE BIO OIL PRETREATMENT AND UPGRADING

CROSS-REFERENCE TO RELATED APPLICATIONS

This application claims priority to U.S. Provisional Application Ser. No. 62/262,948 filed on Dec. 4, 2015, herein incorporated by reference in its entirety.

FIELD

This invention provides methods for thermal conversion of oil fractions derived from biological sources.

BACKGROUND

Bio oils derived from algae, plant, and other biological sources are a potentially substantial source of crude oil for refinery processing. Bio oils can have boiling ranges similar to various refinery feeds, but challenges remain in handling such bio oils. For example, various bio oils can contain about 500 wppm to about 6000 wppm of various potential (catalyst) poisons, including metals, halogenides, silicon, and/or phosphorus. This level of poisons or impurities within a bio oil can cause problems with both conventional transport and/or processing, potentially including fouling, erosion, and/or rapid catalyst deactivation within a pipeline or refinery reaction system.

U.S. Patent Application Publication No. 2010/0034283 describes a method for co-processing of biomass in a delayed coker to produce a crude bio oil.

SUMMARY

In an aspect, a method for upgrading a crude bio oil fraction is provided, the method comprising: thermally cracking a feedstock comprising a first crude bio oil fraction, the first crude bio oil fraction having a metals content of at least about 500 wppm and a T95 boiling point of about 600° C. or less, under effective thermal cracking conditions comprising a temperature of about 300° C. to about 500° C. and a pressure of about 50 kPaa to about 1000 kPaa, for example about 100 kPaa to about 700 kPaa, to form at least a liquid product and a coke product, the coke product comprising metals in an amount of at least about 70 wt % of the metals content of the crude bio oil (for example at least about 80 wt % or at least about 90 wt %), phosphorus in an amount of at least about 70 wt % of a phosphorus content of the crude bio oil (for example at least about 80 wt % or at least about 90 wt %), or a combination thereof.

In another aspect, a coke product formed from thermal cracking of a crude bio oil fraction is provided, the coke product comprising at least about 200 wppm of metals and at least about 150 wppm of phosphorus. Optionally, the coke product can be formed from thermal cracking according to the above aspect.

In still another aspect, a method for upgrading a crude bio oil fraction is provided, the method comprising: fractionating a second crude bio oil fraction, the second crude bio oil fraction having a metals content of at least about 500 wppm and a T95 boiling point of about 600° C. or less, to form at least a first crude bio oil fraction having a T95 boiling point of about 280° C. to about 360° C. and a higher boiling fraction, the first crude bio oil fraction having a metal content of about 150 wppm or less (for example about 100 wppm or less, about 50 wppm or less, about 10 wppm or less, about 5 wppm or less, or about 2 wppm or less); and hydroprocessing a feedstock comprising at least a portion of the first crude bio oil fraction under effective hydrotreating conditions to form a hydroprocessed liquid product having a metals content of about 5 wppm or less, for example of about 2 wppm or less.

In yet another aspect, a method for upgrading a crude bio oil fraction is provided, the method comprising: exposing a biomass feed to effective hydrothermal processing conditions to form at least a second crude bio oil fraction; fractionating the second crude bio oil fraction to form at least a first crude bio oil fraction and a higher boiling fraction, the first crude bio oil fraction optionally having a T95 boiling point of about 280° C. to about 360° C., the first crude bio oil fraction having a metal content of about 100 wppm to about 1500 wppm, for example about 100 wppm to about 1100 wppm, about 100 wppm to about 600 wppm, or about 100 wppm to about 300 wppm; and exposing at least a portion of the first crude bio oil fraction to a demetallization catalyst and a hydrotreating catalyst under effective hydrotreating conditions to form a hydroprocessed liquid product having a metals content of about 5 wppm or less, for example of about 2 wppm or less.

DETAILED DESCRIPTION OF THE EMBODIMENTS

Figure 1:
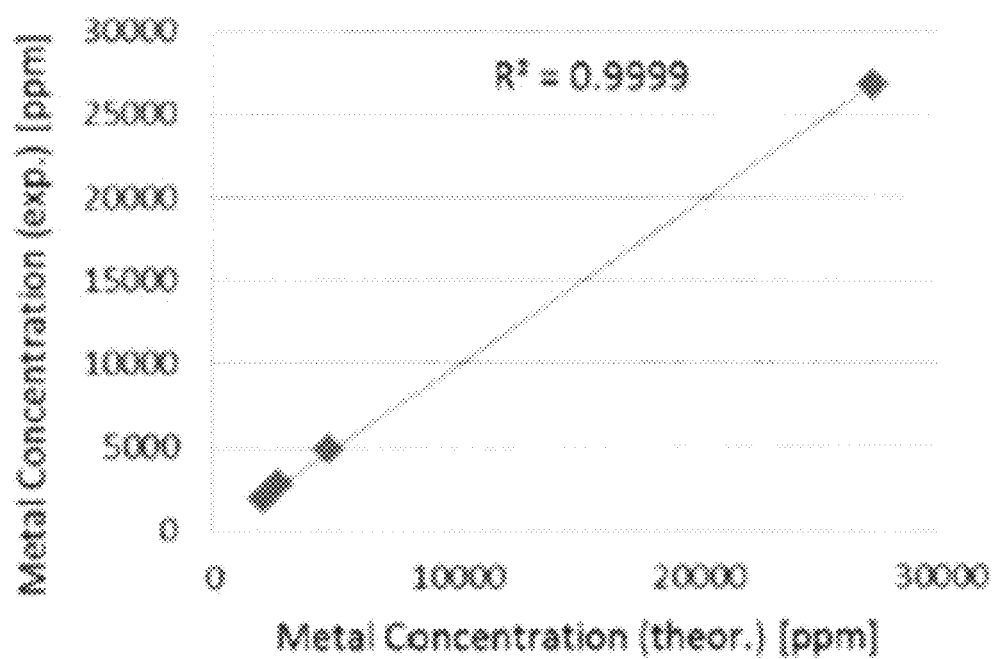
FIG. 1 shows a comparison of measured levels of metal accumulation in a coke product generated by thermal cracking of a crude bio oil fraction relative to predicted levels.

A variety of challenges remain in the development of processes for converting biomass into hydrocarbonaceous (hydrocarbon or hydrocarbon-like) fractions. Assuming a suitable source of biomass is available that can provide desirable hydrocarbonaceous compounds, extracting/separating/otherwise recovering the desirable hydrocarbonaceous material from the biomass can present difficulties. This recovered fraction containing desired hydrocarbons and/or hydrocarbon-like compounds is referred to herein as "crude bio oil". In part because of the difficulties in recovering desirable hydrocarbonaceous compounds from biomass, it has been determined that the recovered material can include substantial concentrations (such as about 500 wppm to about 6000 wppm) of metals, halogenides, phosphorous, silicon, and/or other poisons that can be problematic for conventional transport and refining technologies. Recovered fractions can also include high concentrations of heteroatoms such as nitrogen or oxygen.

Due to the difficulties with current methods for recovering desired hydrocarbonaceous compounds from biomass to form a crude bio oil, this discussion focuses on methods for upgrading the crude bio oil. Such upgrading can allow, for example, transport and/or refining of crude bio oil using conventional methods, while causing a reduced/minimized amount of fouling or poisoning of equipment associated conventional methods. In some aspects, methods are also provided for recovery of metals from residual char or coke formed during upgrading. Such metals recovered from residual char can, for example, be recycled back to a biomass growth process.

Additionally or alternatively, it has been discovered that the nitrogen content of a crude bio oil can be of a lower concern than other heteroatoms. Traditionally, nitrogen has been viewed as a heteroatom that can poison a variety of catalysts that are used in catalytic processing. However, it has been unexpectedly determined that a substantial portion of the nitrogen content of crude bio oils can correspond to nitrogen that can be readily removed during hydrotreatment without causing significant suppression (either short term or long term) of catalyst activity. As a result, in some aspects, the upgraded crude bio oils described herein can correspond to high nitrogen content crude bio oils. Such high nitrogen content crude bio oils can still be suitable for refinery processing and/or co-processing, as described below.

An initial step for conversion of biomass into desirable products can include recovery of crude bio oil from the biomass. The initial recovery of crude bio oil from biomass can be performed using a variety of techniques, including (but not limited to) hydrothermal processing, solvent extraction, thermal processing, and/or thermal catalytic processing such as fluid catalytic cracking. In this discussion, crude bio oil is defined as an oil fraction extracted, separated, converted, or otherwise recovered from biomass. A crude bio oil can have a boiling range of about 20° C. to about 460° C., optionally about 280° C. to about 460° C., depending on the biomass source and the nature of the recovery process. A crude bio oil can have a solids content of about 15 wt % or less and/or a water content of about 30 wt % or less (e.g., about 20 wt % or less). This can reflect the nature of a crude bio oil as a fraction recovered from biomass, as opposed to fraction simply composed of a biomass fraction. Optionally, a crude bio oil can be formed from a biomass source different from algal diatoms. Diatoms can tend to have high silicon content, which can lead to a relatively high silicon content crude bio oil.

The concentration of metals and/or other poisons in crude bio oil can present a variety of problems for conventional processing or transport methods. For example, for a feed with a metals content of greater than about 200 wppm, it is generally estimated that processing about 20 barrels of feed can result in substantial deactivation (so as to require replacement/regeneration) of about 1 kg of catalyst or more. Such a rate of catalyst deactivation can dramatically shorten expected run lengths for fixed bed processing. Even for a fluidized bed process, such a rate of catalyst deactivation can represent an undesirably high catalyst regeneration frequency. Based on a potential poisons content (such as metals) of about 500 wppm to about 6000 wppm in various crude bio oils, attempting to process crude bio oils using a conventional catalytic process can lead to rapid deterioration of catalyst in the process.

In various aspects, systems and methods are provided for pretreatment and/or upgrading of a crude bio oil. After forming a crude bio oil from algae or another biomass source, the crude bio oil can be pre-treated to allow for transport and/or conventional refinery processing with reduced or minimized difficulties. This can include co-transport or co-processing of the pre-treated crude bio oil with a mineral oil.

In some aspects, the pre-treatment can include thermally cracking the crude bio oil, such as by coking. The thermal cracking can form at least a liquid product and bio coke or bio char. It has been determined that an unexpectedly high percentage of the metal impurities and/or other impurities in the crude bio oil can be segregated into the bio char formed during coking. Additionally or alternatively, the resulting liquid product can have a reduced viscosity and/or a reduced TAN (i.e., acidity). The reduced impurities, reduced viscosity, and/or reduced TAN can allow the liquid product to be suitable for transport and/or conventional refinery processing. The bio char can be processed to recover components (such as phosphorous and/or phosphorus-containing compounds) that can be used as nutrients for further biomass growth.

Optionally, the crude bio oil can be flash fractionated prior to thermal cracking. In such optional aspects, a lower boiling fraction from flash fractionation can be suitable for transport and/or further refinery processing. A higher boiling fraction from the flash fractionation can then be thermally cracked to form at least a liquid product (such as a product suitable for transport or further processing) and bio char.

In this discussion, a crude bio oil fraction is defined to include a whole crude bio oil (i.e., a ~100% fraction) and/or a fraction that can be formed from a crude bio oil by performing a separation, such as a distillation.

In the discussion below, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds/zones.

One way of defining a feedstock is based on the boiling range of the feed. One option for defining a boiling range can be to use an initial boiling point for a feed and/or a final boiling point for a feed. Another option, which in some instances may provide a more representative description of a feed, can be to characterize a feed based on the amount of the feed that boils at one or more temperatures. For example, a "T5" boiling point for a feed is defined as the temperature at which ~5 wt % of the feed will boil off. Similarly, a "T95" boiling point is a temperature at which ~95 wt % of the feed will boil off. Generally, crude bio oils can have a T95 boiling point of about 650° C. or less, for example about 600° C. or less or about 550° C. or less, as determined according to ASTM D1160.

In various aspects of the invention, reference may be made to the boiling range of various fractions derived from a crude bio oil and/or from a mineral oil. Such fractions may include naphtha boiling range fractions, kerosene boiling range fractions, diesel boiling fractions, and (atmospheric and/or vacuum) gas oil boiling range fractions. Each of these types of fractions can be defined based on a boiling range. For example, a naphtha boiling range fraction can have an initial boiling point and/or a T5 boiling point of about 20° C., for example about 30° C., and a final boiling point and/or T95 boiling point of about 177° C. This can correspond to T5-T95 boiling ranges of about 20° C. to about 177° C., for example about 30° C. to about 177° C. Alternatively, for some heavier naphtha boiling range fractions, the final boiling point and/or T95 boiling point can be as high as about 193° C., for example about 204° C. This can correspond to T5-T95 boiling ranges of about 20° C. to about 204° C., for example about 20° C. to about 193° C., about 30° C. to about 193° C., or about 30° C. to about 204° C. For a kerosene boiling range fraction, an initial boiling point and/or a T5 boiling point can be as high as about 149° C., for example about 193° C., and a final boiling point and/or a T95 boiling point of about 275° C. Alternatively, for a kerosene boiling range fraction targeted for some uses, such as jet fuel production, the final boiling point and/or T95 boiling point can be about 550° F. (about 288° C.). This can correspond to T5-T95 boiling ranges of about 149° C. to about 288° C., for example about 149° C. to about 275° C., about 193° C. to about 275° C., or about 193° C. to about 288° C. For a diesel boiling range fraction, the initial boiling point and/or T5 boiling point can be about 275° C. and the final boiling point and/or T95 boiling point can be about 360° C. A distillate boiling range fraction can roughly correspond to a combination of a kerosene boiling range and a diesel boiling range. This can correspond to a T5-T95 boiling range of about 149° C. to about 400° C., for example about 149° C. to about 360° C., about 193° C. to about 360° C., or about 193° C. to about 400° C.

For a light vacuum gas oil boiling range fraction, a T5 boiling point can be about 360° C. and a T95 boiling point can be about 460° C. A heavy vacuum gas oil boiling range fraction can have a T5 boiling point of about 460° C. and a T95 boiling point of about 565° C. A vacuum resid fraction can have a T5 boiling point of at least about 535° C., for example at least about 565° C. The final boiling point for a vacuum resid can be any convenient value, such as about 815° C. or less.

Light ends are defined as products with boiling points below about 30° C., or below about 20° C., which can correspond to various C1-C4 compounds. When determining a boiling point or a boiling range for a feed or product fraction, an appropriate ASTM test method can be used, such as the procedures described in ASTM D2887, D1160, and/or D86.

Processing Algae to Form Crude Bio Oil

After harvesting algae, an oil recovery process can be used to separate one or more desired products (corresponding to crude bio oil) from other material, such as residual biomass. Examples include solvent extraction, hydrothermal processing, and/or catalytic thermal processing (such as fluid catalytic cracking). The desired products can correspond to distillate boiling range molecules, molecules suitable for use as a fuel or fuel blending product after optional further processing, and/or other types of molecules including heavier fractions. After extraction, various processes can also be available for separating one or more desired products from the remaining residue.

The total output from an oil recovery process can typically be a mixture of compounds. The mixture can include one or more oils or lipids corresponding to a desired product. The oils or lipids can be mixed with water and various residual solids from the algae. A multi-phase separation can be performed to separate the desired oils and lipids from the water and the residual solids.

An example of a recovery process can be solvent extraction, with an optional water wash prior to solvent extraction. A biomass sample can be exposed to a solvent, such as a water-miscible solvent, optionally at elevated pressure and/or temperature, to extract desired compounds.

An additional or alternative option can be to use hydrothermal processing to rupture the algae cells and then separate out a desired product. Hydrothermal processing can correspond to processing of algae and/or other biomass in the presence of water, an optional oxygenate additive, and optional additional reducing and/or inert gases. Such hydrothermal processing can be enhanced by introducing one or more solvents, such as methanol, ethanol, and/or other alcohols, into the hydrothermal processing environment. Hydrothermal processing can additionally or alternatively be enhanced by introducing an acid into the hydrothermal processing environment. Another additional or alternative option can be to use an alcohol, such as ethanol, to assist with extracting desired products from the algae.

In some aspects, the conditions for hydrothermal processing can be selected to recover oil, while generating a residual product containing at least a portion of (potentially) fermentable material. In such embodiments, the temperature of the reactor (or other hydrothermal processing environment) can be about 50° C. to about 500° C., for example about 50° C. to about 400° C., about 50° C. to about 380° C., about 50° C. to about 350° C., about 50° C. to about 300° C., about 50° C. to about 275° C., about 80° C. to about 500° C., about 80° C. to about 400° C., about 80° C. to about 380° C., about 80° C. to about 350° C., about 80° C. to about 300° C., about 80° C. to about 275° C., about 150° C. to about 500° C., about 150° C. to about 400° C., about 150° C. to about 380° C., about 150° C. to about 350° C., about 150° C. to about 300° C., about 150° C. to about 275° C., about 250° C. to about 500° C., about 250° C. to about 400° C., about 250° C. to about 380° C., about 250° C. to about 350° C., about 250° C. to about 300° C., about 275° C. to about 500° C., about 275° C. to about 400° C., about 275° C. to about 380° C., about 275° C. to about 350° C., about 300° C. to about 500° C., about 300° C. to about 400° C., about 300° C. to about 380° C., or about 300° C. to about 350° C. Additionally or alternatively in such embodiments, the pressure in the reactor can be about 1.0 bar (~0.1 MPa) to about 300 bar (~30.0 MPa), for example about 1.0 bar (~0.1 MPa) to about 250 bar (~25.0 MPa), about 1.0 bar (~0.1 MPa) to about 220 bar (~22.0 MPa), about 1.0 bar (~0.1 MPa) to about 200 bar (~20.0 MPa), about 25 bar (~2.5 MPa) to about 300 bar (~30.0 MPa), about 25 bar (~2.5 MPa) to about 250 bar (~25.0 MPa), about 25 bar (~2.5 MPa) to about 220 bar (~22.0 MPa), about 25 bar (~2.5 MPa) to about 200 bar (~20.0 MPa), about 50 bar (~5.0 MPa) to about 300 bar (~30.0 MPa), about 50 bar (~5.0 MPa) to about 250 bar (~25.0 MPa), about 50 bar (~5.0 MPa) to about 220 bar (~22.0 MPa), about 50 bar (~5.0 MPa) to about 200 bar (~20.0 MPa), about 100 bar (~10.0 MPa) to about 300 bar (~30.0 MPa), about 100 bar (~10.0 MPa) to about 250 bar (~25.0 MPa), about 100 bar (~10.0 MPa) to about 220 bar (~22.0 MPa), or about 100 bar (~10.0 MPa) to about 200 bar (~20.0 MPa). A desirable combination of temperature and pressure can depend on the desired balance between oil recovery and preserving additional utility for the residual solids, as well as the type of algae.

In certain aspects, the hydrothermal processing can be performed under higher severity conditions. The higher severity conditions can result in greater oil recovery, but can tend to generate reduced amounts of fermentable material in residual solids, while also tending to generate ammonia. Suitable higher severity conditions can include aforementioned temperatures above about 300° C. and aforementioned pressures of at least about 1500 psig (~10.3 MPag).

In various aspects, hydrothermal processing can be performed in a batch, semi-batch, or continuous processing environment. The reactor can be any type of batch reactor suitable for handling the processing conditions. Due to the potential presence of water at subcritical or supercritical conditions, stainless steel can be a suitable non-reactive material for the reactor walls. Other materials and/or coatings for the reactor surfaces can be used if compatible with the reaction conditions described below. Examples of suitable reactors can include autoclaves, stirred tanks, and/or plough mixers. In an alternative embodiment, a bubble column could also be used. One possible advantage for batch/semi-batch type processing of an algae feed can be that the algae feed, after removal of water, may have poor flow characteristics. For example, at an algae concentration relative to water of about 20 wt % (~4 parts water to ~1 part algae by weight), the resulting mixture can have the consistency of a paste. Such a paste could be difficult to move using pumps in a continuous flow type reactor.

In embodiments where the algae feed to hydrothermal processing is suitable for direct pumping, a continuous process can be used such as a plug-flow reactor configuration. In such embodiments, the reactor size and flow rate can be matched to desired residence times and temperatures for the algae in the hydrothermal processing environment. Different mixing configurations can include static mixers and/or Tee mixers. Due to the potential presence of water at subcritical or supercritical conditions, stainless steel can be a suitable choice as a non-reactive material for the reactor walls. Other materials and/or coatings for the reactor surfaces compatible with the reaction environment can also be used. Options for continuous processing reactors include fixed bed, open pipe, and/or ebullating bed reactors.

Optionally, a partial pressure of an inert gas and/or a reducing gas can then be introduced into the hydrothermal processing environment. An example of a suitable reducing gas can include hydrogen, while an example of a suitable inert gas can include nitrogen. The partial pressure of additional gas introduced into the reactor can be about 25 bar (~2.5 MPa) to about 100 bar (~10.0 MPa), for example about 25 bar (~2.5 MPa) to about 75 bar (~7.5 MPa), about 25 bar (~2.5 MPa) to about 50 bar (~5.0 MPa), about 40 bar (~4.0 MPa) to about 100 bar (~10.0 MPa), about 40 bar (~4.0 MPa) to about 75 bar (~7.5 MPa), about 40 bar (~4.0 MPa) to about 50 bar (~5.0 MPa), about 50 bar (~5.0 MPa) to about 100 bar (~10.0 MPa), or about 50 bar (~5.0 MPa) to about 75 bar (~7.5 MPa). Note that introducing a reducing gas can correspond to saturating the water for the hydrothermal treatment with the reducing gas.

Another potential addition for the hydrothermal processing environment can include one or more oxygenates such as an alcohol and/or an acid. Acids and/or alcohols in the hydrothermal processing environment can improve the yield of hydrocarbon product, as well as advantageously reducing the nitrogen content of the hydrocarbon product. This latter advantage may be lost, however, if the harvested algae is exposed to the hydrothermal processing conditions at temperatures greater than about 250° C. and/or for processing times greater than about 60 minutes. Suitable alcohols can include any convenient alcohol, such as methanol and/or ethanol. The amount of alcohol introduced into the reaction environment can be approximately equal to the amount of dry algae on a weight basis. More generally, the weight ratio of alcohol to algae to provide a solvent benefit during hydrothermal processing can range from about 1:10 to about 10:1. Suitable acids can include acids compatible with being recycled to an algae growth environment, such as phosphoric acid and/or acetic acid. The concentration of acid to provide a benefit during hydrothermal processing can range from about 0.4 M to about 5.0 M, depending on pH considerations, inter alia.

An additional or alternative option during processing can be the use of a hydrothermal processing catalyst. A hydrothermal processing catalyst can be a catalyst soluble in the hydrothermal reaction environment, or the catalyst can be in the form of catalyst particles in the reaction environment. The catalyst particles can optionally include or be a supported catalyst, with a catalytic material supported on a substrate.

One option for a supported catalyst can be a supported noble metal catalyst. In an embodiment, the noble metal can include or be Pt, Pd, Rh, Ru, Ir, or a combination thereof. The support for the catalyst can advantageously include or be a hydrothermally stable support. Examples of suitable supports can include refractory oxides such as titania and/or zirconia. Silica or activated carbon can additionally or alternatively form a suitable support material. Still other additional or alternative options for a support can include magnesium oxides, hydrotalcites, and/or other various types of clays. Yet another additional or alternative option can be a support composed of a mixture of one or more of the above supports, such as a mixture of two or more of titania, zirconia, and silica. In some alternative embodiments, the support material can be substantially free of alumina, meaning that the support material contains no alumina or no intentionally added alumina, for example contains less than 1 wt % of alumina, less than 0.1 wt % of alumina, or less than 0.01 wt % of alumina.

Another additional or alternative supported catalyst option can include or be a basic metal or mixed metal oxide with/without a noble metal. Non-limiting examples of catalysts without a noble metal can include magnesium oxide, hydrotalcites, and potassium supported on titania and/or zirconia.

Relative to the amount of algae, the amount of supported catalyst in the reactor can be about 0.05 wt % to about 20 wt %, for example about 0.05 wt % to about 15 wt %, about 0.05 wt % to about 10 wt %, about 0.1 wt % to about 20 wt %, about 0.1 wt % to about 15 wt %, about 0.1 wt % to about 10 wt %, about 1.0 wt % to about 20 wt %, about 1.0 wt % to about 15 wt %, about 1.0 wt % to about 10 wt %, about 2.5 wt % to about 20 wt %, about 2.5 wt % to about 15 wt %, or about 2.5 wt % to about 10 wt %.

The amount of metal supported on the catalyst can vary as well. Relative to the weight of the catalyst, the amount of a noble metal supported on the catalyst can be about 0.1 wt % to about 2.0 wt % per weight of catalyst, for example about 0.1 wt % to about 1.5 wt %, about 0.1 wt % to about 1.0 wt %, about 0.1 wt % to about 0.8 wt %, about 0.1 wt % to about 0.6 wt %, about 0.5 wt % to about 2.0 wt %, about 0.5 wt % to about 1.5 wt %, about 0.5 wt % to about 1.0 wt %, about 0.5 wt % to about 0.8 wt %, or about 0.6 wt % to about 2.0 wt %, about 0.6 wt % to about 1.5 wt %, about 0.6 wt % to about 1.0 wt %, about 0.6 wt % to about 0.8 wt %, about 0.8 wt % to about 2.0 wt %, about 0.8 wt % to about 1.5 wt %, about 0.8 wt % to about 1.0 wt %, about 1.0 wt % to about 2.0 wt %, or about 1.0 wt % to about 1.5 wt %. More generally, the amount of metals, either individually or in mixtures, on a catalyst support can be about 0.1 wt % to about 35.0 wt %, for example about 0.1 wt % to about 20.0 wt %, about 0.1 wt % to about 15.0 wt %, about 0.1 wt % to about 10.0 wt %, about 0.1 wt % to about 5.0 wt %, about 0.3 wt % to about 35.0 wt %, about 0.3 wt % to about 20.0 wt %, about 0.3 wt % to about 15.0 wt %, about 0.3 wt % to about 10.0 wt %, about 0.3 wt % to about 5.0 wt %, about 0.5 wt % to about 35.0 wt %, about 0.5 wt % to about 20.0 wt %, about 0.5 wt % to about 15.0 wt %, about 0.5 wt % to about 10.0 wt %, about 0.5 wt % to about 5.0 wt %, about 0.6 wt % to about 35.0 wt %, about 0.6 wt % to about 20.0 wt %, about 0.6 wt % to about 15.0 wt %, about 0.6 wt % to about 10.0 wt %, about 0.6 wt % to about 5.0 wt %, about 0.8 wt % to about 35.0 wt %, about 0.8 wt % to about 20.0 wt %, about 0.8 wt % to about 15.0 wt %, about 0.8 wt % to about 10.0 wt %, about 0.8 wt % to about 5.0 wt %, about 1.0 wt % to about 35.0 wt %, about 1.0 wt % to about 20.0 wt %, about 1.0 wt % to about 15.0 wt %, about 1.0 wt % to about 10.0 wt %, about 1.0 wt % to about 5.0 wt %, about 2.5 wt % to about 35.0 wt %, about 2.5 wt % to about 20.0 wt %, about 2.5 wt % to about 15.0 wt %, about 2.5 wt % to about 10.0 wt %, about 2.5 wt % to about 5.0 wt %, about 5.0 wt % to about 35.0 wt %, about 5.0 wt % to about 20.0 wt %, about 5.0 wt % to about 15.0 wt %, or about 5.0 wt % to about 10.0 wt %.

Separation and Fractionation of Crude Bio Oil

After extraction/recovery, a multi-phase product including both solids and liquids can generally be produced. A crude bio oil can be formed from the multi-phase product by performing a solid-liquid separation or a gas-solid-liquid separation to form a crude bio oil product. The multi-phase separation can optionally also result in a solids fraction that may be suitable for further processing, such as by fermentation, anaerobic digestion, and/or by another convenient method.

Prior to thermal cracking and/or hydroprocessing, the crude bio oil optionally can be fractionated. Fractionation of crude bio oil can be used to separate out naphtha, kerosene, and/or diesel boiling range compounds prior to thermal cracking. The metals content of diesel (or lower) boiling range compounds can be sufficiently low to allow for conventional transport and/or processing, such as hydroprocessing. The heavier portion from fractionation can then be thermally cracked as described herein.

An example of a suitable fractionation process can be a flash fractionation that separates a crude bio oil into a lower boiling and a higher boiling fraction. A cut point or fractionation temperature between the lower boiling and higher boiling fractions can be between about 280° C. to about 360° C., for example about 280° C. to about 340° C., about 280° C. to about 320° C., about 300° C. to about 360° C., about 300° C. to about 340° C., or about 320° C. to about 360° C. In practice, the cut point for a fractionation need not correspond to an initial or final boiling point for either fraction. Instead, the fractions can have some overlap in boiling range. As a result, a cut point or fractionation temperature can correspond to, for example, T95 for the lower boiling fraction and/or T5 for the higher boiling fraction.

Thermal Cracking of Crude Bio Oil

In various aspects, crude bio oil can be thermally cracked to form at least a liquid product and a coke or char product. Coking is a suitable example of a thermal cracking process. Typical configurations for coking can include fluidized coking and delayed coking. Additional or alternative suitable thermal cracking processes can include flexicoking (a type of fluidized coking) and/or visbreaking.

Fluidized coking is a refinery process in which a feedstock is converted to lighter, more valuable materials by thermal decomposition (coking) at temperatures from about 900° F. (482° C.) to about 1100° F. (593° C.). Conventional fluid coking can be performed in a process unit comprised of a coking reactor and a heater or burner. Other fluidized coking configurations can also be used and/or adapted in a manner similar to that described herein for conventional fluidized coking.

For fluidized coking of a crude bio oil, a feedstock including the crude bio oil can be injected into the reactor in a coking zone comprised of a fluidized bed of hot, fine coke particles. The injected feedstock can be distributed relatively uniformly over the surfaces of the coke particles, where it can be cracked to vapors and coke. The vapors can pass through a gas/solids separation apparatus, such as a cyclone, which can remove most of the entrained coke particles. The vapors can then discharged into a scrubbing zone, where the remaining coke particles can be removed and the products cooled to condense the heavy liquids, which can include and/or correspond to the upgraded liquid product from the coking process. The resulting slurry, which can typically contain from about 1 wt % to about 3 wt % coke particles, can be recycled to extinction to the coking zone. The balance of the vapors can go to a fractionator for separation of the gases and the liquids into different boiling fractions.

Some of the coke particles in the coking zone can flow downwardly to a stripping zone at the base of the reactor vessel, where steam can remove interstitial product vapors from or between the coke particles and some adsorbed liquids from the coke particles. The coke particles can then flow down a stand-pipe and into a riser that can move them to a burning/heating zone, where sufficient air can be injected to burn at least a portion of the coke and heat the remainder sufficiently to satisfy the heat requirements of the coking zone, where the unburned hot coke can be recycled. Net coke, above that consumed in the burner, can be withdrawn as product coke. While this is the conventional fluidized coking configuration, it is noted that the coke formed from a crude bio oil can potentially provide valuable products for recycle, such as phosphorus. If desired, instead of using coke as fuel for the coker, a separate fuel can be provided to allow for increased recovery of desired components in the coke.

Optionally, the thermal cracking can correspond to co-processing with a mineral feed. The crude bio oil can be co-processed with a mineral feed during thermal cracking in any convenient ratio. In various aspects, the weight percent of crude bio oil during co-processing with a mineral feed can be from about 1 wt % to about 99 wt % of the feed, for example about 5 wt % to about 99 wt %, about 10 wt % to about 99 wt %, about 20 wt % to about 99 wt %, about 30 wt % to about 99 wt %, about 40 wt % to about 99 wt %, about 50 wt % to about 99 wt %, about 60 wt % to about 99 wt %, about 70 wt % to about 99 wt %, about 80 wt % to about 99 wt %, about 1 wt % to about 90 wt %, about 5 wt % to about 90 wt %, about 10 wt % to about 90 wt %, about 20 wt % to about 90 wt %, about 30 wt % to about 90 wt %, about 40 wt % to about 90 wt %, about 50 wt % to about 90 wt %, about 60 wt % to about 90 wt %, about 70 wt % to about 90 wt %, about 1 wt % to about 80 wt %, about 5 wt % to about 80 wt %, about 10 wt % to about 80 wt %, about 20 wt % to about 80 wt %, about 30 wt % to about 80 wt %, about 40 wt % to about 80 wt %, about 50 wt % to about 80 wt %, about 60 wt % to about 80 wt %, about 1 wt % to about 70 wt %, about 5 wt % to about 70 wt %, about 10 wt % to about 70 wt %, about 20 wt % to about 70 wt %, about 30 wt % to about 70 wt %, about 40 wt % to about 70 wt %, about 50 wt % to about 70 wt %, about 1 wt % to about 60 wt %, about 5 wt % to about 60 wt %, about 10 wt % to about 60 wt %, about 20 wt % to about 60 wt %, about 30 wt % to about 60 wt %, about 40 wt % to about 60 wt %, about 1 wt % to about 50 wt %, about 5 wt % to about 50 wt %, about 10 wt % to about 50 wt %, about 20 wt % to about 50 wt %, about 30 wt % to about 50 wt %, about 1 wt % to about 40 wt %, about 5 wt % to about 40 wt %, about 10 wt % to about 40 wt %, about 20 wt % to about 40 wt %, about 1 wt % to about 30 wt %, about 5 wt % to about 30 wt %, about 10 wt % to about 30 wt %, about 1 wt % to about 20 wt %, about 5 wt % to about 20 wt %, or about 1 wt % to about 10 wt %.

Figure 2:
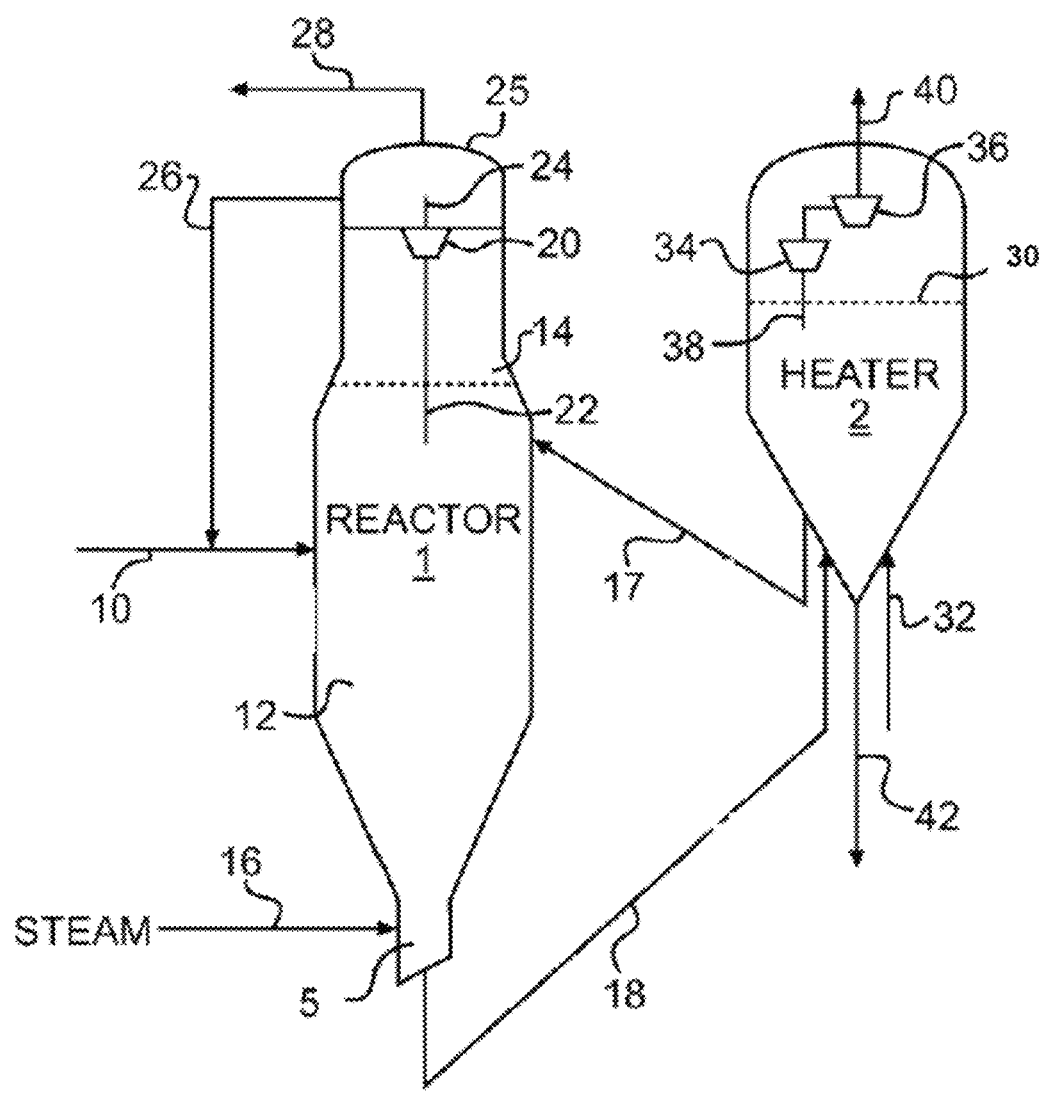
FIG. 2 schematically shows an example of an apparatus for performing coking of a feedstock.

Reference is now made to FIG. 2, which shows a simplified flow diagram of a typical fluidized coking process unit comprised of a coking reactor and a heater. A heavy hydrocarbonaceous chargestock can be conducted via line 10 into coking zone 12 that can contain a fluidized bed of solids having an upper level indicated at 14. Although it can be preferred that the solids, or seed material, be coke particles, they may additionally or alternatively include or be any other refractory materials, such as silica, alumina, zirconia, magnesia, alundum, or mullite, synthetically prepared and/or naturally occurring material, such as pumice, clay, kieselguhr, diatomaceous earth, bauxite, and the like. The solids can have an average particle size of about 40 to 1000 microns, for example from about 40 to 400 microns. For purposes of this FIG. 2, the solid particles are referred to herein as coke, or coke particles.

A fluidizing gas (e.g., steam) can be introduced at the base of coker reactor 1, through line 16, in an amount sufficient to obtained superficial fluidizing velocity in the range of about 0.5 ft/s to about 5 ft/s (~0.15 m/s to ~1.5 m/s). Coke at a temperature above the coking zone temperature (for example, at a temperature from about 100° F. (~38° C.) to about 400° F. (~204° C.), from about 150° F. (~65° C.) to about 350° F. (~177° C.), or from about 150° F. (~65° C.) to about 250° F. (~121° C.)) can be admitted to reactor 1 by line 17 from heater 2 in an amount sufficient to maintain the coking temperature in the range of about 850° F. (~454° C.) to about 1200° F. (~650° C.). The pressure in the coking zone can be maintained in the range of about 0 psig (~0 kPag) to about 150 psig (~1.0 MPag), for example in the range of about 5 psig (~34 kPag) to about 45 psig (~310 kPag). The lower portion of the coking reactor can serve as a stripping zone 5, in which occluded hydrocarbons can be removed from the coke by use of a stripping agent, such as steam, as the coke particles move through the stripping zone. A stream of stripped coke can be withdrawn from the stripping zone 5 via line 18 and conducted to heater 2. Conversion products of the coking zone can be passed through cyclone(s) 20, where entrained solids can be removed and returned to coking zone 12 via dipleg 22. The resulting vapors can exit cyclone 20 via line 24, and pass into a scrubber 25 mounted at the top of the coking reactor 1. The vapors passed into scrubber 25 can be cooled and the heaviest components can be condensed. If desired, a stream of heavy materials condensed in the scrubber may be recycled to the coking reactor via line 26. Coker conversion products (including and/or corresponding to upgraded crude bio oil) can be removed from scrubber 25 via line 28 for fractionation, e.g., in a conventional manner. In heater 2, stripped coke from coking reactor 1 (cold coke) can be introduced via line 18 into a fluidized bed of hot coke having an upper level indicated at 30. The bed can be heated by passing a fuel gas and/or air into the heater via line 32. The gaseous effluent of the heater, including entrained solids, can pass through one or more cyclones which may include first cyclone(s) 34 and second cyclone(s) 36, wherein the separation of the larger entrained solids can occur. The separated larger solids can be returned to the heater via cyclone diplegs 38. The heated gaseous effluent containing entrained solids can be removed from heater 2 via line 40. Excess coke can be removed from heater 2 via line 42. A portion of hot coke can be removed from the fluidized bed in heater 2 and recycled to coking reactor 1 via line 17 to supply heat to the coking zone. Although a gasifier can also be present as part of a coking reaction system, a gasifier is not shown in FIG. 2.

Delayed coking is another process suitable for the thermal conversion of crude bio oil to produce liquid and vapor hydrocarbon products and coke. Delayed coking can be carried out by converting part of the bio oil (or other mineral co-feed) to more valuable hydrocarbon products and coke or char. The resulting coke can have value, depending on its grade, as a fuel (fuel grade coke), electrodes for aluminum manufacture (anode grade coke), etc. The resulting coke can additionally or alternatively be processed to recover phosphorus and/or metals. The recovered phosphorus can be recycled, for example, to a biomass growth process.

In delayed coking a feed can be pumped to a pre-heater at a pressure of about 50 psig (~350 kPag) to about 550 psig (~3.7 MPag), where it can be pre-heated to a temperature from about 480° C. to about 520° C. The pre-heated feed can be conducted to a coking zone, typically a vertically-oriented, insulated coker vessel, e.g., drum, through an inlet at the base of the drum. Pressure in the drum can usually be relatively low, such as about 15 psig (~100 kPag) to about 80 psig (~550 kPag) to allow volatiles to be removed overhead. Typical operating temperatures of the drum can be between about 410° C. and about 475° C. The hot feed thermally can crack over a period of time (the "coking time") in the coker drum, liberating volatiles composed primarily of hydrocarbon products that can continuously rise through the coke mass and be collected overhead. The volatile products can be conducted, for example, to a coker fractionator for distillation and recovery of the upgraded crude bio oil. Optionally, a portion of the upgraded crude bio oil can be captured for recycle and combined with the fresh feed (coker feed component), thereby forming the coker heater or coker furnace charge. In addition to the volatile products, the process can result in the accumulation of coke in the drum. When the coker drum is full of coke, the heated feed can be switched to another drum and hydrocarbon vapors can be purged from the coke drum with steam. The drum can then be quenched with water to lower the temperature from about 200° F. (~93° C.) to about 300° F. (~149° C.), after which the water can be drained. When the cooling step is complete, the drum can be opened and the coke removed, e.g., by drilling and/or cutting using high velocity water jets. The coke removal step is frequently referred to as "decoking".

Conventional coke processing aids can be used, including the use of antifoaming agents. The process can be compatible with processes using air-blown feed in a delayed coking process operated at conditions that can favor the formation of isotropic coke.

In an embodiment, pressure during pre-heat can range from about 50 psig (~350 kPag) to about 550 psig (~3.8 MPag), and pre-heat temperature can range from about 480° C. to about 520° C. Coking pressure in the drum can range from about 15 psig (~100 kPag) to about 80 psig (~550 kPag), and coking temperature can range from about 410° C. and 475° C. The coking time can range from about 0.5 hour to about 72 hours, for example ~0.5 hour to ~24 hours.

Upgraded Product Properties

The thermal cracking process can generate at least a (room temperature) gas phase product, a liquid product, and a solid (coke or char) product. The gas phase product can correspond to various light ends ($C_4$-compounds), $H_2$, and/or volatile heteroatom compounds, such as $H_2S$, $CO_2$, and/or $NH_3$. It is noted that the lower boiling portion from a flash fractionation can optionally correspond to a liquid product.

The liquid product can be characterized in various manners. A boiling range for the total liquid product can include an initial and/or T5 boiling point of at least about 20° C., for example at least about 30° C., which can roughly correspond to a boiling point for $C_5$ hydrocarbons. The boiling range for the total liquid product can additionally or alternatively include a final boiling point, T95 boiling point, and/or T90 boiling point of about 900° F. (~482° C.) or less, for example about 850° F. (~454° C.) or less or about 800° F. (~427° C.) or less. This can correspond to a T5 to T95 boiling range of about 20° C. to about 482° C., for example about 20° C. to about 454° C., about 20° C. to about 427° C., about 30° C. to about 482° C., about 30° C. to about 454° C., or about 30° C. to about 427° C. The upper end of the boiling range for the liquid product can be dependent on the nature of the thermal cracking process.

The metals content of the liquid product can also be characterized. In this discussion, the metals content of a fraction, such as a crude bio oil, a liquid product, or a solid product, is defined to exclude any content of phosphorus and silicon. Most metal concentrations can be determined using inductively coupled plasma (ICP) mass spectrometry. For phosphorus, silicon, and other non-metal contaminants such as halogens, x-ray fluorescence (XRF) can be used. Sulfur can be characterized using XRF and/or conventional ASTM methods can be used for determining sulfur content. Characterizing the metals content can present several difficulties. First, some metals from the reaction vessel, such as metals found in stainless steel, can leach into the thermal cracking product. This can lead to increases in the content of Ni, Cr, and/or Mo in the combined liquid and solid product, relative to the corresponding content in the feed. In other words, the mass balance for Ni, Cr, and Mo may be greater than 100% in the products. An additional difficulty can be related to the detection limit for various metals. At parts per million level concentrations, errors in measurement for many metals in a crude bio oil sample, liquid product sample, and/or solid product sample can be comparable to the measured values.

In some aspects, the metals content of the liquid product can be less than about 1000 wppm, for example less than about 900 wppm, less than about 800 wppm, less than about 700 wppm, or less than about 200 wppm. Additionally or alternatively, the percentage of metals (excluding phosphorus and silicon) remaining in the liquid product after thermal cracking can be characterized relative to the weight of metals in the crude bio oil. The percentage of metals in the liquid product can be about 5 wt % or less of the metals content of the crude bio oil, for example about 4 wt % or less, about 3 wt % or less, or about 2 wt % or less, and optionally at least 10 wppm. Additionally or alternatively, the percentage of metals other than Ni, Cr, and Mo that remain in the liquid product after thermal cracking can be characterized. Characterizing the metals content exclusive of Ni, Cr, and Mo can allow the metals in the liquid product to be characterized without considering metals added to the liquid product from surfaces of stainless steel equipment. The percentage of metals other than Ni, Cr, and Mo in the liquid product can be about 5 wt % or less of the corresponding metals content of the crude bio oil, for example about 4 wt % or less, about 3 wt % or less, or about 2 wt % or less, and optionally at least 10 wppm.

The nitrogen content of the liquid product can also be characterized. In various aspects, the nitrogen concentration in the liquid product can be at least about 0.1 wt %, for example at least about 0.5 wt %, at least about 1 wt %, at least about 2 wt %, or at least about 3 wt %, and optionally about 10 wt % or less. Optionally, the nitrogen content of the liquid product can correspond to nitriles, amides, or a combination thereof.

The content of phosphorus in the liquid product can also be characterized relative to the phosphorus content of the crude bio oil. In various aspects, the phosphorus content of the liquid product can be about 5 wt % or less of the phosphorus content of the crude bio oil, for example about 4 wt % or less, about 3 wt % or less, about 2 wt % or less, or about 1 wt % or less, and optionally at least 10 wppm.

The solid coke or char product from thermal cracking can also be characterized. The coke product can include a substantial majority of the metals present in the crude bio oil prior to upgrading. In various aspects, the metal content (excluding phosphorus and silicon) of the solid coke or char product can correspond to at least about 70 wt % of the metals content of the crude bio oil, for example at least about 80 wt %, at least about 90 wt %, at least about 95 wt %, or at least about 97 wt %. Additionally or alternatively, the metal content other than Ni, Cr, and Mo of the solid coke or char product can correspond to at least about 80 wt % of the corresponding metals content of the crude bio oil, for example at least about 90 wt %, at least about 95 wt %, or at least about 97 wt %. Further additionally or alternatively, the phosphorus content of the solid coke or char product can correspond to at least about 70 wt % of the phosphorus content of the crude bio oil, for example at least about 80 wt %, at least about 90 wt %, at least about 95 wt %, or at least about 97 wt %.

Additionally or alternatively, the metal content of the solid coke or char product can be at least about 200 wppm, for example at least about 300 wppm or at least about 400 wppm, optionally up to about 1000 wppm or more. Additionally or alternatively, the phosphorus content of the solid coke or char product can be at least about 150 wppm, for example at least about 200 wppm, at least about 250 wppm, or at least about 300 wppm, optionally up to about 600 wppm or more.

Subsequent Processing of Liquid Product

After upgrading crude bio oil, e.g., using thermal cracking and/or fractionation, the liquid product can be transported and/or further processed. An example of further processing includes hydroprocessing of the liquid product. Optionally, the hydroprocessing can correspond to co-processing with a mineral feed. The liquid product from thermal cracking of crude bio oil can be co-processed with a mineral feed in any convenient ratio. In various aspects, the weight percent of liquid product from upgrading of crude bio oil during co-processing with a mineral feed can be from about 1 wt % to about 99 wt % of the feed, for example about 5 wt % to about 99 wt %, about 10 wt % to about 99 wt %, about 20 wt % to about 99 wt %, or about 30 wt % to about 99 wt %, about 40 wt % to about 99 wt %, about 50 wt % to about 99 wt %, or about 60 wt % to about 99 wt %, about 70 wt % to about 99 wt %, about 80 wt % to about 99 wt %, about 1 wt % to about 90 wt %, about 5 wt % to about 90 wt %, about 10 wt % to about 90 wt %, about 20 wt % to about 90 wt %, about 30 wt % to about 90 wt %, about 40 wt % to about 90 wt %, about 50 wt % to about 90 wt %, about 60 wt % to about 90 wt %, about 70 wt % to about 90 wt %, about 1 wt % to about 80 wt %, about 5 wt % to about 80 wt %, about 10 wt % to about 80 wt %, about 20 wt % to about 80 wt %, about 30 wt % to about 80 wt %, about 40 wt % to about 80 wt %, about 50 wt % to about 80 wt %, about 60 wt % to about 80 wt %, about 1 wt % to about 70 wt %, about 5 wt % to about 70 wt %, about 10 wt % to about 70 wt %, about 20 wt % to about 70 wt %, about 30 wt % to about 70 wt %, about 40 wt % to about 70 wt %, about 50 wt % to about 70 wt %, about 1 wt % to about 60 wt %, about 5 wt % to about 60 wt %, about 10 wt % to about 60 wt %, about 20 wt % to about 60 wt %, about 30 wt % to about 60 wt %, about 40 wt % to about 60 wt %, about 1 wt % to about 50 wt %, about 5 wt % to about 50 wt %, about 10 wt % to about 50 wt %, about 20 wt % to about 50 wt %, about 30 wt % to about 50 wt %, about 1 wt % to about 40 wt %, about 5 wt % to about 40 wt %, about 10 wt % to about 40 wt %, about 20 wt % to about 40 wt %, about 1 wt % to about 30 wt %, about 5 wt % to about 30 wt %, about 10 wt % to about 30 wt %, about 1 wt % to about 20 wt %, about 5 wt % to about 20 wt %, or about 1 wt % to about 10 wt %. In aspects where co-processing of a crude bio oil fraction with a mineral feed is performed, the mineral feed can optionally be blended with the crude bio oil fraction in a sufficient amount to form a blended feed with a metal content of about 50 wppm or less, for example about 10 wppm or less, about 5 wppm or less, or about 2 wppm or less.

In various aspects, hydrotreating of a feed can be performed by exposing the feed to a hydrotreating catalyst in the presence of hydrogen. A hydrogen stream can, therefore, be fed or injected into a vessel or reaction (hydroprocessing) zone in which the hydroprocessing catalyst is located. Hydrogen, which is contained in a hydrogen-containing "treat gas," can be provided to the reaction zone. Treat gas, as referred to in this invention, can be either pure hydrogen or a hydrogen-containing gas containing hydrogen in an amount sufficient for the intended reaction(s), optionally including one or more other gases (e.g., nitrogen and/or light hydrocarbons such as methane), and which should not adversely interfere with/affect either the reactions or the products. Impurities, such as $H_2S$ and $NH_3$, can typically be undesirable and thus can be removed from the treat gas before it is conducted to the reactor. The treat gas stream introduced into a reaction stage can preferably contain at least about 50 vol % hydrogen, for example at least about 75 vol %.

Hydrotreating conditions can include temperatures of about 200° C. to about 450° C., for example about 315° C. to about 425° C.; pressures of about 250 psig (~1.8 MPag) to about 5000 psig (~34.6 MPag), for example about 300 psig (~2.1 MPag) to about 3000 psig (~20.8 MPag); liquid hourly space velocities (LHSV) of about 0.1 $hr^{-1}$ to about 10 $hr^{-1}$; and hydrogen treat rates of about 200 scf/B (~36 $Nm^3/m^3$) to about 10,000 scf/B (~1800 $Nm^3/m^3$), for example about 500 scf/B (~89 $Nm^3/m^3$) to about 10,000 scf/B (1800 $Nm^3/m^3$).

The hydrotreatment can be performed using a conventional hydrotreating catalyst, such as a catalyst comprising at least one Group VIII non-noble metal (Columns 8-10 of IUPAC periodic table), preferably containing Fe, Co, and/or Ni, such as at least Ni; and at least one Group VI metal (Column 6 of IUPAC periodic table), such as Mo and/or W. Such hydroprocessing catalysts can optionally include transition metal sulfides. These metals or mixtures of metals can typically be present as oxides or sulfides on refractory metal oxide supports. Suitable metal oxide supports can include low acidity oxides that are stable when water is present in the reaction environment, such as silica, titania, zirconia, silica-titania, and combinations thereof. Alumina is typically not hydrothermally stable, but alumina could otherwise be suitable, if sufficiently stabilized. The supports are preferably not promoted with a halogen such as fluorine, as this can generally increase the acidity of the support.

The at least one Group VIII non-noble metal, in oxide form, can typically be present in an amount ranging from about 2 wt % to about 40 wt %, for example from about 4 wt % to about 15 wt %. The at least one Group VI metal, in oxide form, can typically be present in an amount ranging from about 2 wt % to about 70 wt %, for example, for supported catalysts, from about 6 wt % to about 40 wt % or from about 10 wt % to about 30 wt %. These weight percents are based on the total weight of the catalyst. Suitable metal catalysts can include Co/Mo (~1-10% Co as oxide, ~10-40% Mo as oxide), Ni/Mo (~1-10% Ni as oxide, ~10-40% Co as oxide), and/or Ni/W (~1-10% Ni as oxide, ~10-40% W as oxide) on silica, zirconia, silica-titania, or titania.

Alternatively, the hydrotreating catalyst can include or be a bulk metal catalyst, or a combination of stacked beds of supported and bulk metal catalyst. By bulk metal, it is meant that the catalysts are unsupported wherein the bulk catalyst particles comprise ~30-100 wt % of at least one Group VIII non-noble metal and at least one Group VIB metal, based on the total weight of the bulk catalyst particles, calculated as metal oxides, and wherein the bulk catalyst particles can have a surface area of at least 10 $m^2/g$. It is furthermore preferred that the bulk metal hydrotreating catalysts, when present, comprise about 50 wt % to about 100 wt %, for example about 70 wt % to about 100 wt %, of at least one Group VIII non-noble metal and at least one Group VIB metal, based on the total weight of the particles, calculated as metal oxides. The amount of Group VIB and Group VIII non-noble metals can easily be determined, e.g., using VIB TEM-EDX.

In addition to a hydrotreating catalyst, a crude bio oil fraction can also be exposed to a demetallization catalyst under hydrotreating conditions. The demetallization catalyst can be located upstream from the hydrotreating catalyst or in the same catalyst bed. An example of a demetallization catalyst is a catalyst (optionally) including NiMo or CoMo on a support with a median pore diameter of about 200 Å or greater. A demetallization catalyst can represent a lower activity catalyst that is effective for removing at least a portion of the metals content of a feed. This can allow a less expensive catalyst to be used to remove a portion of the metals, thus extending the lifetime of any subsequent higher activity catalysts.

The hydrotreating conditions can be dependent on the nature of the process used for forming the crude bio oil. For example, a crude bio oil fraction formed by pyrolysis of biomass can tend to have a substantial water content. Additionally, the oxygen- and/or nitrogen-containing compounds in such a crude bio oil fraction can be susceptible to oligomerization. For this type of crude bio oil fraction, an initial hydrotreating step can be performed under lower severity conditions to convert at least a portion of the oxygenates in the feed to alcohols. A second higher temperature hydrotreatment process can then be performed on the partially treated effluent. An example of lower severity hydrotreatment conditions for an initial process can include a temperature of about 200° C. to about 300° C. and/or a pressure of about 250 psig (~1.8 MPa) to about 1000 psig (~6.9 MPa). The LHSV and hydrogen treat gas rate can be similar to the values noted above.

As another example, a crude bio oil formed by hydrothermal processing can be less susceptible to oligomerization, as the oxygenate compounds in such a crude bio oil can tend to be alcohols and fatty acids. For a crude bio oil formed by hydrothermal processing of biomass, a single step hydrotreatment process can be used.

Co-Feeds: Mineral Feedstocks

In various aspects, a mineral co-feed may be used either during thermal cracking of the bio oil and/or during subsequent hydroprocessing of the upgraded crude bio oil. The co-feed can be any convenient co-feed having a suitable boiling range for co-processing. For the thermal cracking, a suitable co-feed can be a heavy oil co-feed. For the subsequent hydroprocessing, a suitable co-feed can be a distillate and/or gas oil boiling range feed.

Examples of heavy oils can include, but are not limited to, heavy crude oils, distillation residues, heavy oils from catalytic treatment (such as heavy cycle bottom slurry oils from fluid catalytic cracking), thermal tars (such as oils from visbreaking, steam cracking, or similar thermal/non-catalytic processes), oils (such as bitumen) from oil sands, heavy oils derived from coal, and the like, as well as combinations thereof.

Heavy oil feedstocks can be liquid or semi-solid. Examples of heavy oils that can be hydroprocessed, treated, and/or upgraded according to this invention can include bitumens and residuum from refinery distillation processes, including atmospheric and/or vacuum distillation processes. Such heavy oils can have an initial boiling point of about 650° F. (~343° C.) or greater. Preferably, the heavy oils can have a 10% distillation point (T10) of at least about 650° F. (~343° C.), alternatively at least about 660° F. (~349° C.) or at least about 750° F. (~399° C.). In some aspects the 10% distillation point (T10) can be still greater, such as at least about 900° F. (~482° C.), at least about 950° F. (~510° C.), at least about 975° F. (~524° C.), at least about 1020° F. (~549° C.), or at least about 1050° F. (~566° C.). In this discussion, boiling points can be determined by a convenient method, such as ASTM D86, ASTM D2887, or another suitable standard method.

In addition to initial boiling points and/or 10% distillation points (T10), other distillation points may also be useful in characterizing a feedstock. For example, a feedstock can be characterized based on the portion of the feedstock that boils above ~1050° F. (~566° C.). In some aspects, a feedstock can have a 70% distillation point (T70) of ~1050° F. (~566° C.) or greater, for example a 60% distillation point (T60) of ~1050° F. (~566° C.) or greater, a 50% distillation point (T50) of ~1050° F. (~566° C.) or greater, or a 40% distillation point (T40) of ~1050° F. (~566° C.) or greater.

Density, or weight per volume, of the heavy hydrocarbon can be determined according to ASTM D287-92 (2006) for API Gravity of Crude Petroleum and Petroleum Products (Hydrometer Method), and is provided in terms of API gravity. In general, the higher the API gravity, the less dense the oil. API gravity can be 20° or less, for example 15° or less or 10° or less.

Heavy oil feedstocks (also referred to as heavy oils) can be high in metals. For example, the heavy oil can be high in total nickel, vanadium, and/or iron contents. In one embodiment, the heavy oil can contain at least 0.00005 grams of Ni/V/Fe (50 wppm) or at least 0.0002 grams of Ni/V/Fe (200 wppm) per gram of heavy oil, on a total elemental basis of nickel, vanadium and iron. In other aspects, the heavy oil can contain at least about 500 wppm of nickel, vanadium, and/or iron, such as at least about 1000 wppm.

Contaminants such as nitrogen and sulfur are typically found in heavy oils, often in organically-bound form. Nitrogen content can range from about 50 wppm to about 10,000 wppm elemental nitrogen or more, based on total weight of the heavy hydrocarbon component. The nitrogen containing compounds can be present as basic or non-basic nitrogen species. Examples of basic nitrogen species can include quinolines and/or substituted quinolines. Examples of non-basic nitrogen species can include carbazoles and/or substituted carbazoles.

Generally, the sulfur content of such heavy oils can range from about 500 wppm to about 100000 wppm elemental sulfur, for example from about 1000 wppm to about 50000 wppm or from about 1000 wppm to about 30000 wppm, based on total weight of the heavy component. Sulfur can usually be present as organically bound sulfur. Examples of such sulfur compounds can include the class of heterocyclic sulfur compounds such as thiophenes, tetrahydrothiophenes, benzothiophenes, and their higher homologs and analogs. Other organically bound sulfur compounds can include aliphatic, naphthenic, and aromatic mercaptans, sulfides, and di- and polysulfides.

Heavy oils can be high in n-pentane asphaltenes. In some aspects, the heavy oil can contain at least about 5 wt % of n-pentane asphaltenes, such as at least about 10 wt % or at least 15 wt % n-pentane asphaltenes.

Still another method for characterizing a heavy oil feedstock is based on the Conradson Carbon Residue of the feedstock. The Conradson Carbon Residue of the feedstock can be about 5 wt % to about 50 wt %, for example about 5 wt % to about 40 wt %, about 5 wt % to about 30 wt %, about 10 wt % to about 50 wt %, about 10 wt % to about 40 wt %, about 10 wt % to about 30 wt %, about 20 wt % to about 50 wt %, about 20 wt % to about 40 wt %, or about 20 wt % to about 30 wt %.

Processing of Product Solids for Recycle of Nutrients

One potential use for biochar can be as a soil amendment for growth of biomass. In certain embodiments, some of the product solids can be recycled for use as nutrients for growth of further algae or other biomass. An example of this type of recycle can be recycling of phosphorus compounds. In order to recycle the phosphorus, the phosphorus can be converted from the solid form into a precursor form that can be readily processed into a suitable nutrient. An example of this type of conversion can be conversion of phosphorus in the product solids into a more easily distributable form, such as phosphoric acid. The phosphoric acid can then be used as a nutrient and/or as a precursor or reagent to make a suitable nutrient.

Phosphorus can be contained in the product solids in a variety of forms, such as phosphates and/or phosphites, and may be coordinated by Ca, Mg, Fe and/or other multivalent cations. The solids can also contain carbon compounds. In order to separate the phosphorus from the carbon, the phosphorus in the solids can, in one embodiment, be converted to phosphoric acid. Conversion of phosphorus to phosphoric acid is a known reaction, and can be performed by treating the phosphorus containing solids with sulfuric acid. The sulfuric acid can react with the phosphorus to form phosphoric acid. The sulfate ions from the sulfuric acid can combine with Ca, Mg, and/or Fe cations and precipitate out. In such situations, the carbon may remain as additional solid product. The sulfate solids and carbon can be separated from the phosphoric acid by physical/known/conventional means, e.g., using filtration or a settling pond.

Configuration Examples—Co-Processing with Mineral Feed

One option for processing of crude bio oil can be to pretreat the crude bio oil in a manner that can allow subsequent co-processing with a mineral feed in a hydrotreatment process. In order to preserve catalyst activity and/or run length, the concentration of permanent poisons (i.e., metals) in the combined feed can be below about 1.5 wppm. This can be achieved by pretreating a crude bio oil to reduce the permanent poisons to about 150 wppm or less. The pretreated crude bio oil can then be blended with mineral oil to produce a combined feed with less than about 1.5 wppm of permanent poisons. An additional pretreatment process can be to fractionate the crude bio oil, if needed, so that after hydrotreatment the resulting product can correspond to a distillate boiling product. Flash fractionation can be a suitable pretreatment that can generate an overhead (lower boiling) fraction to meet requirements. The bottoms generated from flash fractionation can be sent to a delayed coker. An example of a suitable hydrotreatment process for co-processing can be hydrotreatment of a feed to a fluid catalytic cracking process, which is sometimes referred to as a catalytic feed hydrotreatment process.

Another co-processing scenario can be to send crude bio oil to a delayed coker. While this option can reduce/minimize the need to pretreat the crude bio oil, high value components of the crude bio oil such as triglycerides and free fatty acids can also be converted to products of lower value such as gasoline.

Configuration Examples—Stand Alone Processing of Crude Bio Oil

Another alternative can be to perform standalone processing on a bio oil derived from hydrothermal recovery or another recovery process that can generate a crude bio oil with a permanent poison concentration lower than about 1100 wppm. For example, a crude bio oil with a permanent poison concentration of less than about 1100 wppm can be sent directly to a wide cut hydrotreater to reduce distillate loss. In order to accommodate the elevated level of metals, a suitable reaction system design can include a plurality of individual reactors in series that can each contain a hydrodemetallization catalyst and a hydrotreatment/hydrodeoxygenation catalyst. The plurality of reactors can be swing reactors, so that one or more reactors can be offline for catalyst replacement while the remaining reactors are processing. For example, a configuration with 4 reactors can have 3 permanently online in series, while one can stay offline for catalyst replacement. The run length for a reactor can vary depending on the concentration of poisons in the feed. It is noted that the effective hydrotreatment conditions can also be selected in order to account for the oxygen content of the feed and/or the exotherm generated due to deoxygenation.

Another standalone processing option can be to send crude bio oil to a delayed coker without pretreatment. This can reduce the level of permanent poisons to about 200 wppm to about 900 wppm. While this can be a suitable level of poison reduction, but such poison levels can have a high risk of affecting the coker and/or downstream processes. Using a pretreatment step to reduce the level of poisons to below about 550 wppm can be desirable to reduce catalyst cost and unit size. The unit design could be similar to the configuration described above, such as having 4 individual swing reactors in series. Flash fractionation can be used for pretreatment.

Additional Embodiments

Additionally or alternatively, the invention can be described by one or more of the following embodiments.

Embodiment 1

A method for upgrading a crude bio oil fraction, comprising: thermally cracking a feedstock comprising a first crude bio oil fraction, the first crude bio oil fraction having a metals content of at least about 500 wppm and a T95 boiling point of about 600° C. or less, under effective thermal cracking conditions comprising a temperature of about 300° C. to about 500° C. and a pressure of about 50 kPaa to about 1000 kPaa (for example about 100 kPaa to about 700 kPaa) to form at least a liquid product and a coke product, the coke product comprising metals in an amount of at least about 70 wt % of the metals content of the crude bio oil (for example at least about 80 wt % or at least about 90 wt %), phosphorus in an amount of at least about 70 wt % of a phosphorus content of the crude bio oil (for example at least about 80 wt % or at least about 90 wt %), or a combination thereof.

Embodiment 2

The method of Embodiment 1, further comprising: fractionating a second crude bio oil fraction to form a fraction having a T5 boiling point of about 280° C. to about 360° C., the first crude bio oil fraction comprising at least a portion of the fraction having a T5 boiling point of about 280° C. to about 360° C.

Embodiment 3

The method of any of the above embodiments, further comprising: hydroprocessing at least a portion of the liquid product under effective hydrotreating conditions to form a hydroprocessed liquid product.

Embodiment 4

The method of Embodiment 3, wherein hydroprocessing at least a portion of the liquid product further comprises hydroprocessing a first mineral feed with the at least a portion of the liquid product, the at least a portion of the liquid product comprising at least about 5 wt % of a combined weight of the at least a portion of the liquid product and the first mineral feed.

Embodiment 5

The method of any of the above embodiments, wherein the effective thermal cracking conditions comprise effective conditions for delayed coking, fluidized coking, and/or visbreaking.

Embodiment 6

The method of any of the above embodiments, further comprising treating at least a portion of the coke product to recover phosphorus, and optionally recycling at least a portion of the recovered phosphorus to a biomass growth process.

Embodiment 7

The method of any of the above embodiments, wherein hydroprocessing at least a portion of the liquid product under effective hydrotreating conditions comprises exposing the at least a portion of the liquid product to a demetallization catalyst and a hydrotreating catalyst under effective hydrotreating conditions.

Embodiment 8

The method of any of the above embodiments, wherein the liquid product comprises at least about 0.5 wt % of nitrogen, the at least about 0.5 wt % of nitrogen optionally comprising at least about 0.5 wt % of nitrogen in nitriles, amides, or a combination thereof.

Embodiment 9

The method of any of the above embodiments, wherein the metals content of the liquid product is about 700 wppm or less, for example about 500 wppm or less or about 300 wppm or less.

Embodiment 10

The method of any of the above embodiments, wherein the liquid product has a metals content in an amount of about 3 wt % or less of the metals content of the crude bio oil.

Embodiment 11

The method of any of any of the above embodiments, wherein the liquid product has a phosphorus content in an amount of about 3 wt % or less of the phosphorus content of the crude bio oil.

Embodiment 12

A method for upgrading a crude bio oil fraction, comprising: fractionating a second crude bio oil fraction, the second crude bio oil fraction having a metals content of at least about 500 wppm and a T95 boiling point of about 600° C. or less, to form at least a first crude bio oil fraction having a T95 boiling point of about 280° C. to about 360° C. and a higher boiling fraction, the first crude bio oil fraction having a metal content of about 150 wppm or less (for example about 100 wppm or less, about 50 wppm or less, about 10 wppm or less, about 5 wppm or less, or about 2 wppm or less); and hydroprocessing a feedstock comprising at least a portion of the first crude bio oil fraction under effective hydrotreating conditions to form a hydroprocessed liquid product having a metals content of about 5 wppm or less (for example about 2 wppm or less).

Embodiment 13

The method of Embodiment 12, wherein hydroprocessing the feedstock under effective hydrotreating conditions comprises exposing the feedstock to a demetallization catalyst and a hydrotreating catalyst under effective hydrotreating conditions.

Embodiment 14

The method of Embodiment 12 or 13, wherein the feedstock has a metals content of about 10 wppm or less (e.g., about 5 wppm or less or about 2 wppm or less).

Embodiment 15

The method of any of Embodiments 12-14, wherein the feedstock further comprises a second mineral feed, the first crude bio oil fraction comprising about 2 wt % of a combined weight of the first crude bio oil fraction and the second mineral feed (for example about 1 wt % or less).

Embodiment 16

The method of any of the above embodiments, wherein the feedstock further comprises a third mineral feed, the first crude bio oil fraction comprising at least about 5 wt % of a combined weight of the first crude bio oil fraction and third mineral feed (for example at least about 10 wt %, at least about 20 wt %, at least about 30 wt %, at least about 40 wt %, or at least about 50 wt %).

Embodiment 17

A method for upgrading a crude bio oil fraction, comprising: exposing a biomass feed to effective hydrothermal processing conditions to form at least a second crude bio oil fraction; fractionating the second crude bio oil fraction to form at least a first crude bio oil fraction and a higher boiling fraction, the first crude bio oil fraction optionally having a T95 boiling point of about 280° C. to about 360° C., the first crude bio oil fraction having a metal content of about 100 wppm to about 1500 wppm, or alternatively about 1100 wppm or less (for example about 600 wppm or less or about 300 wppm or less); and exposing at least a portion of the first crude bio oil fraction to a demetallization catalyst and a hydrotreating catalyst under effective hydrotreating conditions to form a hydroprocessed liquid product having a metals content of about 5 wppm or less (for example about 2 wppm or less).

Embodiment 18

The method of Embodiment 17, wherein the effective hydrothermal processing conditions comprise a temperature of about 50° C. to 500° C. (e.g., about 80° C. to about 400° C., about 150° C. to about 380° C., about 250° C. to about 350° C., or about 250° C. to about 300° C.) and a pressure of about 1 bar (about 0.1 MPa) to about 300 bar (about 30 MPa), e.g., about 25 bar (about 2.5 MPa) to about 250 bar (about 25 MPa), about 50 bar (about 5 MPa) to about 250 bar (about 25 MPa), or about 100 bar (about 10 MPa) to about 200 bar (about 20 MPa).

Embodiment 19

The method of Embodiment 17 or 18, wherein the crude bio oil fraction comprises at least about 0.5 wt % of nitrogen, the at least about 0.5 wt % of nitrogen optionally comprising at least about 0.5 wt % of nitrogen in nitriles, amides, or a combination thereof.

Embodiment 20

The method of any of Embodiments 17-19, wherein the metals content of the crude bio oil fraction is about 700 wppm or less.

Embodiment 21

The method of any of Embodiments 3-20, wherein the metals content of the hydroprocessed liquid product is about 10 wppm or less (for example about 5 wppm or less or about 2 wppm or less).

Embodiment 22

The method of any of Embodiments 3-21, wherein the hydroprocessed liquid product comprises a distillate boiling range product having a T5 boiling point of at least about 149° C. (for example at least about 193° C.), and a T95 boiling point of about 400° C. or less (for example about 360° C. or less).

Embodiment 23

The method of any of embodiments 3-22, wherein the effective hydrotreating conditions comprise temperatures of about 200° C. to about 450° C., for example about 315° C. to about 425° C.; pressures of about 250 psig (about 1.8 MPag) to about 5000 psig (about 35 MPag), for example about 300 psig (about 2.1 MPag) to about 3000 psig (about 20.8 MPag); liquid hourly space velocities (LHSV) of about 0.1 $hr^{-1}$ to about 10 $hr^{-1}$; and hydrogen treat rates of about 200 scf/B (about 36 $Nm^3/m^3$) to about 10000 scf/B (about 1800 $Nm^3/m^3$), for example about 500 (about 89 $Nm^3/m^3$) to about 10000 scf/B (about 1800 $Nm^3/m^3$).

Embodiment 24

A liquid product formed according to any of Embodiments 1-11.

Embodiment 25

A coke product formed according to any of Embodiments 1-11.

Embodiment 26

A coke product formed from thermal cracking of a crude bio oil fraction, the coke product comprising at least about 200 wppm of metals and at least about 150 wppm of phosphorus.

Embodiment 27

The coke product of Embodiment 26, wherein the coke product comprises at least about 300 wppm of metals, e.g., at least about 400 wppm of metals; and/or wherein the coke product comprises at least about 250 wppm of phosphorus, e.g., at least about 300 wppm of phosphorus.

EXAMPLES

Example 1—Examples of Crude Bio Oils

Hydrothermal treatment is an example of a potential recovery process for algae oil recovery and/or recovery of crude bio oil from other types of biomass. Table 1 shows examples of crude bio oils corresponding to a crude bio oil derived from beef tallow and a crude bio oil derived from hydrothermal processing of algae.

TABLE 1

Examples of Crude Bio Oils

| Permanent Poisons | Crude Tallow [ppm] | CBO [ppm] |
|---|---|---|
| Phosphorus | ~18-~1420 | ~210 |
| Silicon | — | ~130 |
| Calcium | ~3-~2033 | ~160 |
| Magnesium | ~1-~99 | ~59 |
| Iron | ~6-~104 | ~2000 |
| Sodium | ~3-~2362 | ~300 |
| Potassium | — | ~190 |
| Manganese | — | ~29 |
| Nickel | — | ~130 |
| Zinc | — | ~250 |
| Molybdenum | — | ~160 |
| Aluminum | — | ~44 |
| Total | ~32-~6019 | ~3662 |

Example 2—Coking of Crude Bio Oil

To simulate coking, Micro Carbon Residue (MCR) measurements of crude bio oil/vacuum resid blends were conducted. The crude bio oil in this example corresponded to a crude bio oil formed by hydrothermal processing of an algae feed. MCR analysis (ASTM D189) can determine a material's tendency to thermally degrade and form coke under high temperature pyrolyzing conditions. In these experiments, the samples were heated to ~500° C. and held there for ~15 minutes in an inert atmosphere. The generated coke product was then analyzed for its metals content by Inductive Coupled Plasma (ICP) to determine the amount of metals rejected in the coke.

Based off of the residual carbon yields of the pure resid and pure crude bio oil, theoretical values of residual carbon were calculated for blends having ~5 wt %, ~20 wt %, and ~50 wt % of crude bio oil. The calculated as well as the experimentally obtained values are summarized in Table 2.

TABLE 2

Results from MCR Measurements

| Sample | wt % CBO | wt % vac resid | wt % MCR (exp) | wt % MCR (theor) |
|---|---|---|---|---|
| Crude Bio Oil (CBO) | ~100 | ~0 | ~3.0 | ~3.0 |
| Vac resid | ~0 | ~100 | ~21.7 | ~21.7 |
| 5% blend | ~4.9 | ~95.1 | ~21.5 | ~20.7 |
| 20% blend | ~20.2 | ~79.8 | ~19.0 | ~17.9 |
| 50% blend | ~50.2 | ~49.8 | ~13.0 | ~12.3 |

As shown in Table 2, co-processing of crude bio oil (corresponding to beef tallow or generated by hydrothermal processing of algae) and a mineral feed by coking appeared to result in an amount of coke comparable to an expected amount based on a linear combination of the feeds, with an apparent small reduction in the amount of expected coke.

Example 3—Metals Characterization

To determine if the metals in the crude bio oil were accumulated in the carbon residue (coke), the theoretical metals content of the carbon residue was calculated, assuming that all metals in the crude bio oil and the vacuum resid were transferred to the coke and none remained in the liquid product. The calculated values were compared with the actual metals concentrations measured by ICP. The values were plotted against each other and shown in FIG. 1. Similar to Table 2, the theoretical and measured values appear to be in good agreement, indicating that the metals in both feeds are likely accumulated in the coke product.

Example 4—Thermal Cracking of Crude Bio Oil

Autoclave experiments with ~100% crude bio oil (derived from hydrothermal processing of algae) were conducted in ~300 cc stainless steel autoclaves. To simulate a delayed coking process, water was added to the system in a water/crude bio oil weight ratio of ~1:72. For comparison, the experiment was also conducted in the absence of water, but with otherwise identical conditions. The experiments were run at about 468° C. for about 1 hour. Prior to coking, the crude bio oil was distilled at about 320° C. to remove light material, so as to avoid pressure build up above the safety limit of the autoclave. The ~320° C.– cut accounted for approximately 10 wt % of the entire crude bio oil. The autoclaves were loaded with ~50 g of the crude bio oil ~320° C.+ cut. After the run, the autoclaves were emptied and rinsed with toluene. The total liquid product, including the toluene fraction, was filtered to receive the coke and the solvent removed from the total liquid product. Gaseous products were not collected/analyzed. Gas yields were estimated by difference. The product yields from the experiments with/without water are shown in Table 3.

TABLE 3

Delayed Coking Yield Comparison

| | Yield Coke [wt %] | Yield Total Liquid Product [wt %] | Yield Gas [wt %] |
|---|---|---|---|
| Experiment w/o water | ~17.9 | ~32.5 | ~49.6 |
| Experiment w/water | ~16.2 | ~34.5 | ~49.3 |

As shown in Table 3, the total liquid product yield (~20° C. to ~460° C.) appeared to increase with $H_2O$ present in the reaction environment, while the gas yield appeared comparable. This appears to show that the delayed coking environment should be favorable for liquid product production relative to thermal cracking in an inert atmosphere.

Figure 3:
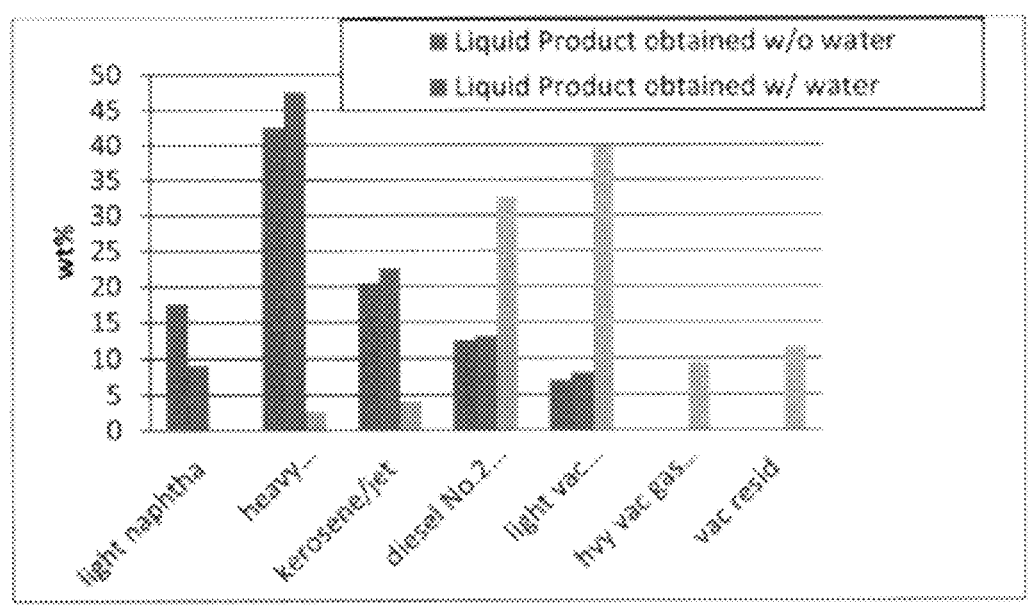
FIG. 3 shows a comparison of product obtained from performing thermal cracking with and without the presence of additional steam in the reaction environment.

It is noted that the coke yields for crude bio oil in Table 3 appeared higher than the coke yields obtained from MCR measurements (for example, such as the coke yield shown in Table 2). Without being bound by any particular theory, it is believed that the increased pressure in the autoclave experiments relative to typical coking conditions can lead to the strong variation observed in coke yield, as MCR experiments were performed at atmospheric pressure. To further characterize the liquid product, SIMDIS (simulated distillation) analysis was conducted on the liquid product to obtain the boiling point distribution. The results are depicted in FIG. 3. The defined boiling point ranges for the individual cuts are listed in Table 4.

TABLE 4

Boiling Point Ranges for Thermal Cracking Products

| Product | Temperature range ° C. |
|---|---|
| Light naphtha | ~21-~82.2 |
| Heavy naphtha | ~82.2-~193.3 |
| Kerosene/Jet | ~193.3-~276.7 |
| Diesel/No 2 fuel | ~276.7-~360 |

TABLE 4-continued

Boiling Point Ranges for Thermal Cracking Products

| Product | Temperature range ° C. |
|---|---|
| Light vac gas oil | ~360-~456 |
| Heavy vac gas oil | ~456-~565.6 |
| Vac resid | ~565.6-~816 |

FIG. 3 shows the product distributions, as well as the distribution of cuts in the crude bio oil used as the feed. In FIG. 3, when either two or three data bars are shown, the left-most bar corresponds to liquid product generated in the absence of added water. The next bar shows the liquid product generated with added steam. When three data bars are present, the right-most bar shows the original feed. The original feed is also the only bar present for the higher boiling range components (heavy vacuum gas oil and vacuum resid). It is noted that the full boiling range of the crude bio oil is shown in FIG. 3, as opposed to just the ~320° C.+ portion used as the feed for the autoclave experiments. As shown in FIG. 3, the heavy portions of the crude bio oil appeared to be substantially completely converted to lower boiling range products. The product distributions obtained in the presence and absence of water did not appear to differ dramatically. One difference noted was that thermal cracking in the presence of water appeared to reduce the yield of fuel gas and LPG and appeared to increase the yield of light naphtha in the sample generated from the experiment with water.

The coke and liquid product from the autoclave experiments were analyzed via ICP and XRF to determine metals speciation and quantification. While ICP can be a quantitative measurement, the measurement variation for some metals present in the products appears to be on a similar order of magnitude as the measured values. It is also noted that XRF can typically be only semi-quantitative. Thus, values of metals only detected by XRF should be noted with caution, as they can represent a ball park number but may not represent an accurate value. Table 5 lists the results obtained from ICP analysis. The first three metals listed (Cr, Ni, Mo) appeared to be present in the feed at very low concentrations, but were detected in the products, and particularly in the coke at significant levels. The mass balances range from ~250 to over 5000. Without being bound by any particular theory, it is believed that these metals, all additives of steel, can represent contaminants introduced to the products during the coking runs. Other metals detected at significant concentrations in feed and products include alkaline and earth alkaline metals, as well as Fe, Al, Zn, and Cu. With mass balances ranging from ~93% to ~150%, it was assumed that these metals originated from the feed. About 93-97% of the metals detected by ICP appeared to accumulate in the coke product. These results seem in good agreement with the ICP results of the coke generated from the MCR measurements.

TABLE 5

Metals Characterization in Upgraded Liquid Product

| ICP | Metals in Feed [ppm] | Metals in Coke [ppm] | Metals in TLP [ppm] | Mass Balance % |
|---|---|---|---|---|
| Cr | ~14 | ~214 | ~4 | ~257 |
| Ni | ~1 | ~419 | ~111 | ~5124 |
| Mo | ~2 | ~95 | ~2 | ~870 |
| Na | ~84 | ~477 | ~185 | ~148 |

TABLE 5-continued

Metals Characterization in Upgraded Liquid Product

| ICP | Metals in Feed [ppm] | Metals in Coke [ppm] | Metals in TLP [ppm] | Mass Balance % |
|---|---|---|---|---|
| K | ~41 | ~259 | ~57 | ~154 |
| Ca | ~180 | ~961 | ~76 | ~96 |
| Mg | ~31 | ~205 | ~40 | ~123 |
| Fe | ~211 | ~1520 | ~94 | ~127 |
| Al | ~69 | ~360 | ~21 | ~93 |
| Cu | ~51 | ~276 | ~31 | ~101 |
| Zn | ~583 | ~3160 | ~33 | ~93 |
| Co | ~4 | ~24 | ~1 | ~107 |
| % in feed excl. Ni, Cr, Mo [%] | ~100 | ~97 | ~7 | ~104 |

Table 6 lists the non-metallic elements detected by XRF that were not captured by ICP measurements. Based on the results in Table 6, it is believed that Cl, which was only present at low concentrations in the feed, was likely introduced into the products from external sources during processing. Again, the accuracy of concentrations and mass balances appeared low, as XRF is typically a semi-quantitative method. The results, however, indicated that P and Br were accumulated in the coke, while S and Si found their way into both liquid and coke product.

TABLE 6

Non-Metal Characterization

| XRF | Metals in Feed [ppm] | Metals in Coke [ppm] | Metals in TLP [ppm] | Mass Balance [%] |
|---|---|---|---|---|
| Si | ~98 | ~1250 | ~115 | ~237 |
| S | ~976 | ~4870 | ~3400 | ~254 |
| P | ~240 | ~3580 | ~0 | ~147 |
| Cl | ~39 | ~860 | ~897 | ~1102 |
| Br | ~8 | ~17 | ~0 | ~39 |
| [%] of feed | ~100 | ~132 | ~66 | ~198 |

Example 5—Flash Fractionation of Crude Bio Oil

A weighed amount of ~300° C. hydrothermally recovered crude bio oil was exposed to a ~370° C. flash in a tube furnace. Under these conditions, ~30 wt % of the crude bio oil appeared to separate into the bottoms. Table 7 shows that ~91% of the metals and poisons were removed from the overhead. The majority of remaining poison in the overhead appeared to be silicon. The flash fractionation can be performed at higher temperatures to reject metals into the bottoms, while maximizing the overhead yield.

TABLE 7

Non-Metals Concentrations in Flash Fractionated Crude Bio Oil

| | Concentration [ppm] | |
|---|---|---|
| | Crude Bio Oil | 370° C.- Overhead |
| Si | ~130 | ~190 |
| P | ~210 | ~0 |
| Na | ~300 | ~0 |
| K | ~190 | ~13 |
| Ca | ~160 | ~29 |
| Mg | ~59 | ~0 |
| Mn | ~29 | ~15 |
| Fe | ~2000 | ~17 |
| Ni | ~130 | ~23 |
| Zn | ~250 | ~28 |

TABLE 7-continued

Non-Metals Concentrations in Flash Fractionated Crude Bio Oil

| | Concentration [ppm] | |
|---|---|---|
| | Crude Bio Oil | 370° C.- Overhead |
| Mo | ~160 | ~26 |
| Al | ~44 | ~0 |
| Total | ~3662 | ~341 |

Example 6—Nitrogen Removal from Upgraded Crude Bio Oil

Crude bio oil recovered from high protein biomass by thermal, catalytic, and/or hydrothermal processing can contain high levels of nitrogen, such as up to about 8 wt %. Typical nitrogen species present in crude bio oil can be amides and nitrites. The coking processes (and/or other thermal cracking processes) described herein can also lead to the formation of nitrites by dehydration of amides. To simulate co-processing and test the effect of biomass derived oxygen and nitrogen species on conventional hydroprocessing catalysts, a heavy coker gas oil (CGO) was spiked with different nitrogen species and an ester. Mixtures spiked with nitrogen were prepared to have a total N concentration of about 3 wt %, while those spiked with oxygen were prepared to have a total oxygen concentration of about 5 wt %. The feeds are summarized in Table 8. The initial heavy coker gas oil prior to any spiking contained about 0.26 wt % N and about 3.2 wt % S. Hydroprocessing runs were conducted in batch microreactors over a commercially available supported NiMo hydrotreating catalyst at ~320° C. and ~40 bar (~4 MPa) hydrogen for about 10 hours. The catalysts were presulfided in $H_2S$ (~3%, ~14 bar) at ~330° C.

TABLE 8

Feeds used for Nitrogen Removal Characterization

| | CGO | CGO w/ Stearonitrile | CGO w/ ethylstearate and stearamide |
|---|---|---|---|
| wt % S | ~3.23 | ~1.47 | ~0.94 |
| wt % N | ~0.26 | ~3 | ~3 |
| wt % O | ~0 | ~0 | ~5 |

Figure 4:
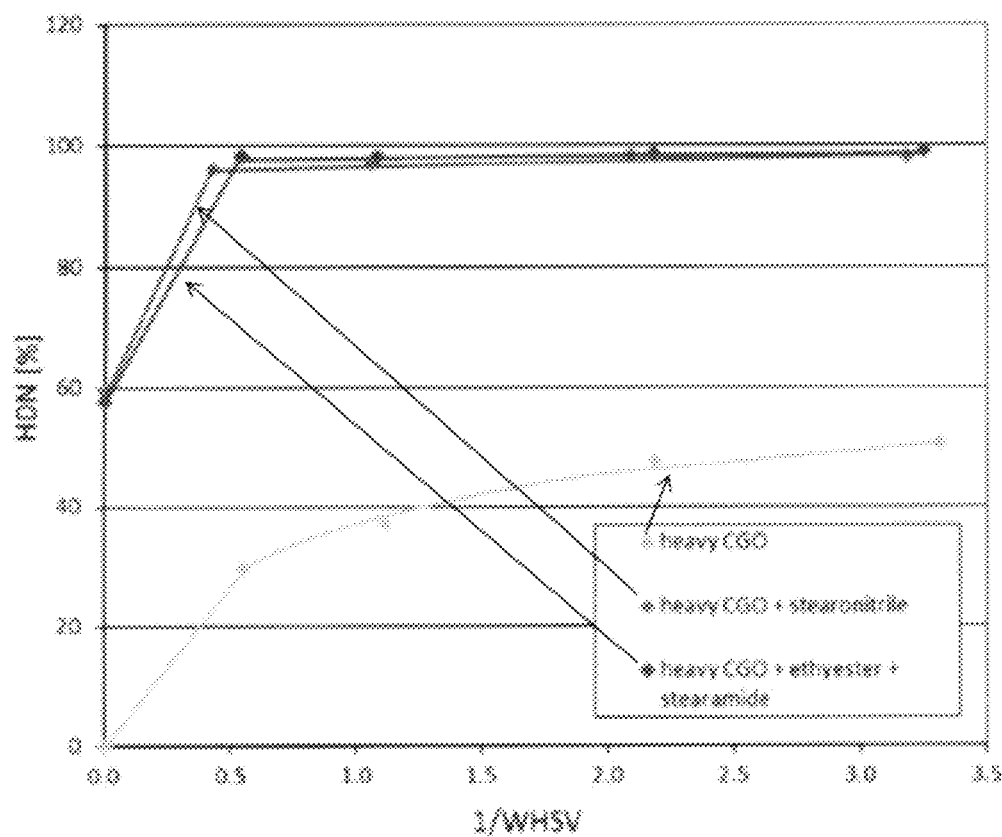
FIG. 4 shows results from hydrodenitrogenation of coker gas oils spiked with examples of nitrogen compounds derived from biological sources.

FIG. 4 shows the percentage of hydrodenitrogenation (HDN) for the different feeds obtained over varying loadings of the hydrotreating catalyst. For hydrodenitrogenation of a conventional mineral coker gas oil, FIG. 4 shows that typical hydrodenitrogenation values were between ~30% and ~50%. By contrast, the coker gas oils containing additional stearonitrile or additional stearonitrile and stearamide appeared to show substantially higher denitrogenation amounts. The bio-molecules stearonitrile and stearamide appeared to show high reactivity towards denitrogenation, and the spiked coker gas oil reached values of ~60% HDN by mere thermal conversion in the absence of a catalyst (1/WHSV≈0). The HDN values approached 100% even at low catalyst loadings. Comparison to the pure coker gas oil revealed that the nitrogen species present in the petroleum derived feed appeared to be much less reactive and more difficult to denitrogenate than the bio-derived amides and nitriles.

Figure 5:
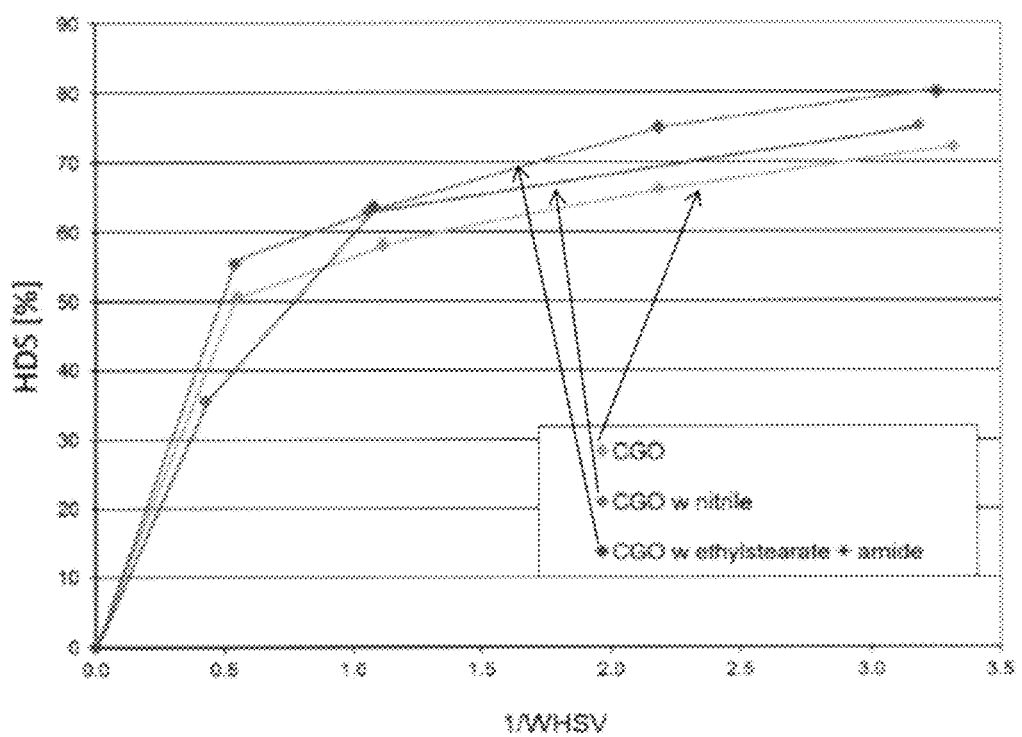
FIG. 5 shows results from hydrodesulfurization of coker gas oils spiked with examples of nitrogen compounds derived from biological sources.

FIG. 5 shows the effect of the added nitrogen species on hydrodesulfurization (HDS) of the coker gas oil. The sulfur compounds in the coker gas oil did not appear to be reactive under thermal HDS conditions, as significant sulfur removal without catalyst was not observed. The addition of bio-derived species, such as ester, amide and nitrile did not appear to degrade sulfur removal from the coker gas oil. It must, however, be taken into account that, due to dilution, the spiked coker gas oil feeds contained less sulfur than the ~100% coker gas oil. Thus, potential heavy molecules such as coke precursors, which can lead to reduced HDS rates, were present in a lower concentration in the spiked feeds.

The results in FIGS. 4 and 5 appear to show that milder conditions can be applied for hydroprocessing of bio-derived oils for nitrogen reduction, as compared to conditions required for hydroprocessing of petroleum derived oils having similar nitrogen and/or sulfur concentrations. Due to the higher activity of the bio-derived nitrogen species towards denitrogenation, these species did not appear to have a negative effect on HDS and did not appear to behave as catalyst poisons. Their high reactivity can allow for the application of much lower hydrogen partial pressures. Therefore, lower cost gas mixtures such as sour gas mixtures and syngas can potentially be used for hydroprocessing instead of high grade hydrogen.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for upgrading a crude bio oil fraction, comprising:
    thermally cracking a feedstock comprising a first crude bio oil fraction, the first crude bio oil fraction having a metals content of at least about 1000 wppm and a T95 boiling point of about 600° C. or less, under effective thermal cracking conditions comprising a temperature of about 300° C. to about 500° C. and a pressure of about 50 kPaa to about 1000 kPaa, to form at least a liquid product and coke product, the coke product comprising metals in an amount of at least about 80 wt % of the metals content of the crude bio oil and phosphorus in an amount of at least about 80 wt % of a phosphorus content of the crude bio oil, and
    treating at least a portion of the coke product to recover phosphorus and recycling at least a portion of the recovered phosphorus to a biomass growth process.

2. The method of claim 1, further comprising:
    fractionating a second crude bio oil fraction to form a fraction having a T5 boiling point of about 280° C. to about 360° C., the first crude bio oil fraction comprising at least a portion of the fraction having a T5 boiling point of about 280° C. to about 360° C.

3. The method of claim 1, further comprising:
    hydroprocessing at least a portion of the liquid product under effective hydrotreating conditions to form a hydroprocessed liquid product.

4. The method of claim 3, wherein hydroprocessing at least a portion of the liquid product further comprises hydroprocessing a first mineral feed with the at least a portion of the liquid product, the at least a portion of the liquid product comprising at least about 5 wt % of a combined weight of the at least a portion of the liquid product and the first mineral feed.

5. The method of claim 3, wherein hydroprocessing at least a portion of the liquid product under effective hydrotreating conditions comprises exposing the at least a portion of the liquid product to a demetallization catalyst and a hydrotreating catalyst under effective hydrotreating conditions.

6. The method of claim 3, wherein the metals content of the hydroprocessed liquid product is about 2 wppm or less.

7. The method of claim 1, wherein the feedstock further comprises a second mineral feed, the first crude bio oil fraction comprising at least about 5 wt % of a combined weight of the first crude bio oil fraction and the second mineral feed.

8. The method of claim 1, wherein the liquid product comprises at least about 0.5 wt % of nitrogen.

9. The method of claim 8, wherein the at least about 0.5 wt % of nitrogen comprises at least about 0.5 wt % of nitrogen in nitriles, amides, or a combination thereof.

10. The method of claim 1, wherein the effective thermal cracking conditions comprise effective conditions for delayed coking, fluidized coking, and/or visbreaking.

11. The method of claim 1, wherein the metals content of the liquid product is about 700 wppm or less.

12. The method of claim 1, wherein the liquid product has a metals content in an amount of about 3 wt % or less of the metals content of the crude bio oil.

13. The method of claim 1, wherein the liquid product has a phosphorus content in an amount of about 3 wt % or less of the phosphorus content of the crude bio oil.

* * * * *